US 8,407,585 B2

(12) United States Patent
Mansfield

(10) Patent No.: US 8,407,585 B2
(45) Date of Patent: Mar. 26, 2013

(54) CONTEXT-AWARE CONTENT CONVERSION AND INTERPRETATION-SPECIFIC VIEWS

(75) Inventor: Philip Andrew Mansfield, Vancouver (CA)

(73) Assignee: Apple Inc., Cupertino, CA (US)

( * ) Notice: Subject to any disclaimer, the term of this patent is extended or adjusted under 35 U.S.C. 154(b) by 1527 days.

(21) Appl. No.: 11/407,604

(22) Filed: Apr. 19, 2006

(65) Prior Publication Data

US 2007/0250762 A1    Oct. 25, 2007

(51) Int. Cl.
    *G06F 17/21*    (2006.01)
(52) U.S. Cl. .......................................... 715/236
(58) Field of Classification Search ................. 715/236, 715/273
    See application file for complete search history.

(56) References Cited

U.S. PATENT DOCUMENTS

| | | | | |
|---|---|---|---|---|
| 6,397,232 B1* | 5/2002 | Cheng-Hung et al. | ........ | 715/203 |
| 6,725,426 B1* | 4/2004 | Pavlov | ........ | 715/205 |
| 6,782,531 B2* | 8/2004 | Young | ........ | 717/130 |
| 6,820,094 B1* | 11/2004 | Ferguson et al. | ........ | 1/1 |
| 6,912,529 B1* | 6/2005 | Kolfman | ........ | 707/10 |
| 6,964,011 B1* | 11/2005 | Mizuno | ........ | 715/210 |
| 6,993,711 B1* | 1/2006 | Tanaka et al. | ........ | 715/248 |
| 7,251,777 B1* | 7/2007 | Valtchev et al. | ........ | 715/234 |
| 7,492,949 B1* | 2/2009 | Jamieson | ........ | 382/217 |
| 7,509,572 B1* | 3/2009 | Melander et al. | ........ | 715/234 |
| 7,937,265 B1* | 5/2011 | Pasca et al. | ........ | 704/9 |
| 2001/0032217 A1* | 10/2001 | Huang | ........ | 707/513 |
| 2002/0046235 A1* | 4/2002 | Foy et al. | ........ | 709/203 |
| 2002/0103835 A1* | 8/2002 | Kearney | ........ | 707/530 |
| 2002/0107913 A1* | 8/2002 | Rivera et al. | ........ | 709/203 |
| 2002/0178171 A1* | 11/2002 | Walker et al. | ........ | 707/102 |
| 2002/0194227 A1* | 12/2002 | Day et al. | ........ | 707/523 |
| 2003/0014447 A1* | 1/2003 | White | ........ | 707/530 |
| 2003/0023634 A1* | 1/2003 | Justice et al. | ........ | 707/517 |
| 2003/0028503 A1* | 2/2003 | Giuffrida et al. | ........ | 707/1 |
| 2003/0084405 A1* | 5/2003 | Ito et al. | ........ | 715/513 |
| 2003/0093760 A1* | 5/2003 | Suzuki et al. | ........ | 715/523 |
| 2003/0106021 A1* | 6/2003 | Mangrola | ........ | 715/513 |
| 2003/0110236 A1* | 6/2003 | Yang et al. | ........ | 709/219 |
| 2003/0110442 A1* | 6/2003 | Battle | ........ | 715/500 |
| 2003/0126136 A1* | 7/2003 | Omoigui | ........ | 707/10 |
| 2003/0149934 A1* | 8/2003 | Worden | ........ | 715/513 |
| 2003/0176996 A1* | 9/2003 | Lecarpentier | ........ | 704/7 |
| 2003/0221170 A1* | 11/2003 | Yagi | ........ | 715/517 |
| 2004/0001099 A1* | 1/2004 | Reynar et al. | ........ | 345/776 |
| 2004/0083199 A1* | 4/2004 | Govindugari et al. | ........ | 707/1 |
| 2004/0194009 A1* | 9/2004 | LaComb et al. | ........ | 715/500 |
| 2004/0205452 A1* | 10/2004 | Fitzsimons et al. | ........ | 715/500 |

(Continued)

OTHER PUBLICATIONS

Gurcan et al.; Converting PDF to XML with Publication-Specific Profiles; Proceedings of the XML Conference 2003—ideaalliance. org, Dec. 2003, pp. 1-11.*

(Continued)

*Primary Examiner* — Laurie Ries
*Assistant Examiner* — Frank D Mills
(74) *Attorney, Agent, or Firm* — Fletcher Yoder PC

(57) ABSTRACT

Content encoding rendering is disclosed. An indication of a desired interpretation of a starting content having a first encoding is received. The starting content is processed to generate a representation data comprising a second encoding of the starting content, wherein the second encoding is determined automatically and at least in part by the desired interpretation. The representation data is rendered using a view associated with the desired interpretation.

29 Claims, 8 Drawing Sheets

U.S. PATENT DOCUMENTS

| | | | | |
|---|---|---|---|---|
| 2004/0205616 | A1* | 10/2004 | Rosenberg et al. | 715/523 |
| 2004/0205621 | A1* | 10/2004 | Johnson et al. | 715/523 |
| 2004/0243645 | A1* | 12/2004 | Broder et al. | 707/200 |
| 2004/0243930 | A1* | 12/2004 | Schowtka et al. | 715/513 |
| 2004/0268249 | A1* | 12/2004 | Fennelly et al. | 715/523 |
| 2005/0060648 | A1* | 3/2005 | Fennelly et al. | 715/523 |
| 2005/0066273 | A1* | 3/2005 | Zacky | 715/517 |
| 2005/0132284 | A1* | 6/2005 | Lloyd et al. | 715/517 |
| 2005/0154979 | A1* | 7/2005 | Chidlovskii et al. | 715/513 |
| 2005/0166143 | A1* | 7/2005 | Howell | 715/523 |
| 2005/0187954 | A1* | 8/2005 | Raman et al. | 707/100 |
| 2005/0193334 | A1* | 9/2005 | Ohashi et al. | 715/517 |
| 2005/0203924 | A1* | 9/2005 | Rosenberg | 707/100 |
| 2005/0210374 | A1* | 9/2005 | Lander | 715/513 |
| 2005/0229099 | A1* | 10/2005 | Rogerson et al. | 715/523 |
| 2005/0240876 | A1* | 10/2005 | Myers et al. | 715/763 |
| 2006/0004638 | A1* | 1/2006 | Royal et al. | 705/26 |
| 2006/0101058 | A1* | 5/2006 | Chidlovskii | 707/102 |
| 2006/0112029 | A1* | 5/2006 | Estes | 706/16 |
| 2006/0117307 | A1* | 6/2006 | Averbuch et al. | 717/143 |
| 2006/0136809 | A1* | 6/2006 | Fernstrom | 715/505 |
| 2006/0150088 | A1* | 7/2006 | Kraft et al. | 715/517 |
| 2006/0161559 | A1* | 7/2006 | Bordawekar et al. | 707/100 |
| 2006/0271843 | A1* | 11/2006 | Yarde et al. | 715/513 |
| 2007/0011134 | A1* | 1/2007 | Langseth et al. | 707/1 |
| 2007/0027905 | A1* | 2/2007 | Warren et al. | 707/103 R |
| 2007/0028166 | A1* | 2/2007 | Hundhausen et al. | 715/530 |
| 2007/0136660 | A1* | 6/2007 | Gurcan et al. | 715/513 |
| 2007/0192687 | A1* | 8/2007 | Simard et al. | 715/523 |
| 2007/0203693 | A1* | 8/2007 | Estes | 704/9 |
| 2008/0016020 | A1* | 1/2008 | Estes | 706/52 |
| 2008/0126080 | A1* | 5/2008 | Saldanha et al. | 704/9 |
| 2008/0147716 | A1* | 6/2008 | Omoigui | 707/102 |

OTHER PUBLICATIONS

Childlovskii, Supervised Learnding for the Legacy Document Conversion, p. 220-228 (DocEng '04, ACM, 2004).*

Kettler et al., A Template-Based Markup Tool for Semantic Web Content, p. 446-460 (Lecture Notes in Computer Science vol. 3729, Springer-Verlag Berlin Heidelberg, 2005).*

Lum et al., A Context-Aware Decision Engine for Content Adaptation, IEEE Pervasive Computing, Jul.-Sep. 2002, p. 41-49.*

Villard et al., An XML-Based Multimedia Document Processing Model for Content Adaptation, Springer-Verlag Berlin Heidelberg, Lecture Notes in Computer Science vol. 2023, 2004, p. 104-119.*

Kurz et al., FACADE—A Framework for Context-Aware Content Adaption and Delivery, IEEE Proceedings of the Second Annual Conference on Communication Networks and Services Research, 2004, p. 1-10.*

Pradhan et al., Semantic Role Parsing: Adding Semantic Structure to Unstructured Text, IEEE Proceedings of the Third IEEE International Conference on Data Mining, 2003, p. 1-4.*

Philip Andrew Mansfield, *Consistent Electronic Publishing from Inconsistent Sources*, XML 2004 Conference, Nov. 15-19, 2004, Washington, D.C., U.S.A.

* cited by examiner

CONTEXT-AWARE CONTENT CONVERSION AND INTERPRETATION-SPECIFIC VIEWS

BACKGROUND OF THE INVENTION

Often electronic content data do not consistently adhere to one standard on format, organization, and use in consistent software. For example, each individual content data creator may choose to save electronic content data in various formats including a variety of text formats, document formats, spread sheet formats, presentation formats, visual graphic formats (e.g. chart, graph, map, drawing, image formats), audio formats, multimedia (e.g. video formats) formats, and database formats. Even when content data is encoded using standards-based formats, such as xml, often many different schemas are used. This heterogeneous nature of the electronic content data can pose challenges when the various content need to be re-purposed, re-styled, searched, combined, transformed, rendered or otherwise processed. Existing solutions typically require a user to convert heterogeneous content to a specific format required for desired processing. In some cases, it is difficult for a user to determine both the specific content format and the content formatting application best suited for the desired processing. Many standard tools for format conversion operate at inconsistent semantic levels, or encode an inappropriate semantic level, potentially causing information needed to perform desired content management and/or electronic publishing functions, for example, to be lost. Therefore, there exists a need for a better way to process electronic content.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Rendering electronic content in a desired manner, regardless of source format, is disclosed. In some embodiments, an indication of a desired interpretation of a starting content having a first encoding is used to process the starting content to a second encoding of the starting content. The second encoding is determined at least in part by the desired interpretation and rendered using a view associated with the desired interpretation. In various embodiments, an encoding of content is associated with a file format of the content, an organization of data in the content, a structure of data in the content, an attribute of data in the content, a semantic relationship of data in the content, and/or stored/in-memory representation of content.

Figure 1:
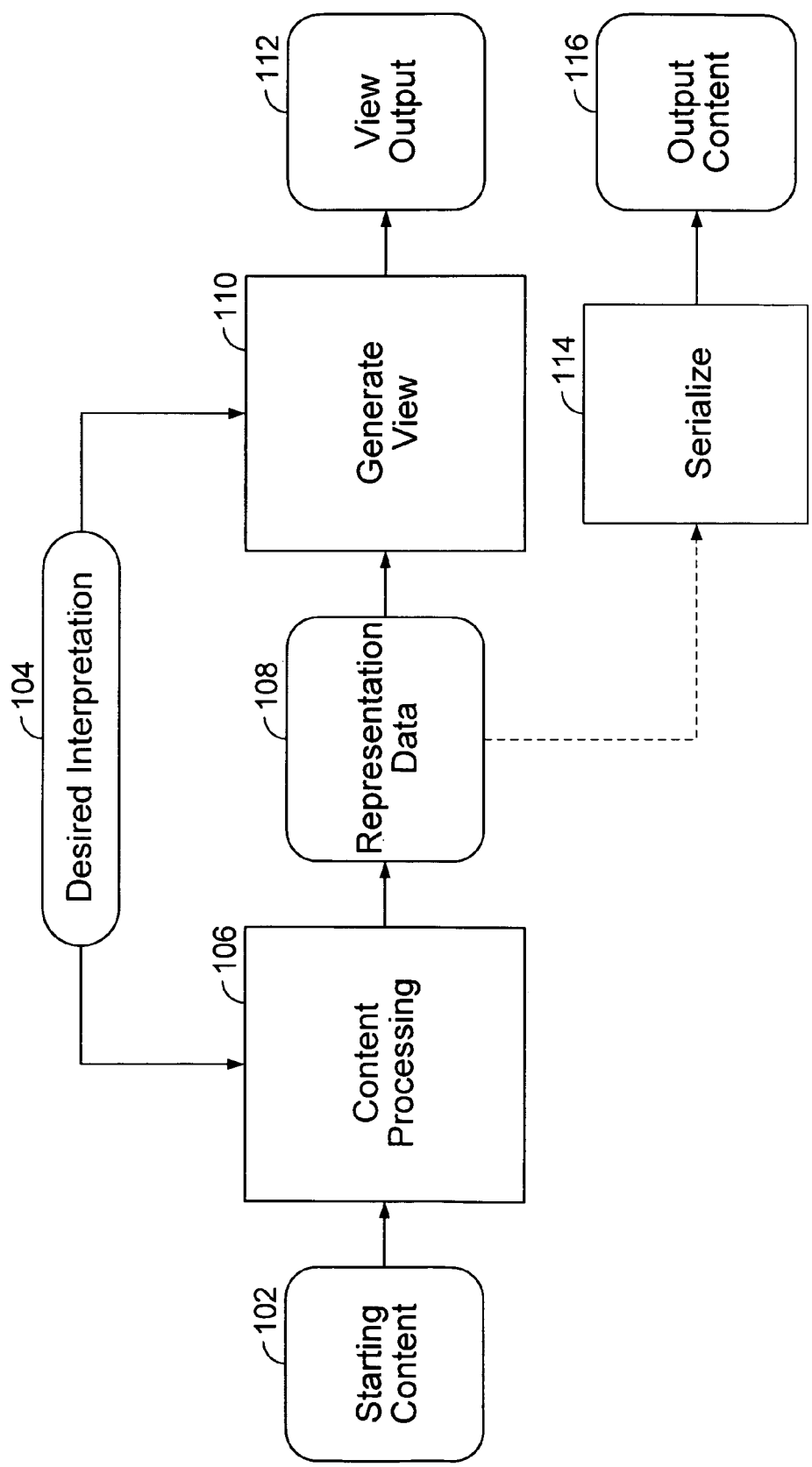
FIG. 1 is a flow diagram illustrating an embodiment of a process for transforming and rendering electronic content.

FIG. 1 is a flow diagram illustrating an embodiment of a process for transforming and rendering electronic content. Starting content 102 includes a document and/or other content data. The content may be specified by a user and/or selected by an automatic process. In some embodiments, stating content 102 includes data encoded using one or more of the following formats: a text format, a document format, a spread sheet format, a presentation format, a visual graphic format (e.g. chart, graph, map, drawing, image formats), an audio format, a multimedia (e.g. video) format, and a database format. In various embodiments, starting content 102 is in an encoding native to one or more content-editing and/or authoring programs, such as Apple Pages™, Microsoft Word™, Microsoft Excel™, Apple Keynote™, or Microsoft PowerPoint™, or created indirectly from the content-editing programs and/or a subsequent process, such as by being saved in a portable format such as PDF. In some embodiments, starting content 102 includes data derived from one or more format conversions and/or content aggregation.

Desired interpretation 104 in some embodiments includes at least a portion of a specification associated with how to interpret the starting content. For example, a starting content document can be specified to be interpreted as a curriculum vitae (CV), a journal article, a magazine article, a newspaper article, a greeting card, a poster, a presentation, a photo album, an expense form, a financial report, a graph, a flowchart, or a map. In some embodiments, the specification of desired interpretation 104 does not require knowledge of an output encoding format and/or file format of the starting content. Using starting content 102 and desired interpretation 104, content processing 106 is performed. In some embodiments, content processing 106 includes parsing and reconstructing starting content 106 in accordance with desired interpretation 104. For example, starting content 102 is parsed and up-converted into a meta-language encoded representation. Up-conversion includes converting the starting content into a higher semantic encoding, such as by determining with respect to content elements comprising the starting content one or more semantic relationships not encoded in the source content data comprising the starting content 102. In some embodiments, semantic data included, expressly or implicitly, in and/or otherwise associated with, the starting content data is used at least in part to convert the starting content to a higher semantic encoding. Up-conversion includes reconstruction of semantic structure, e.g., the association of letters to form words, words to form paragraphs, etc.; the organization of paragraphs into columns and/or sections/regions, such as caption boxes, sidebars, text inserts, etc.; the use of different heading levels to provide titles, subtitles, etc. The reconstruction, in some embodiments, includes reconstructing the semantic structure of starting content 102 with one or more additional semantic encoding than were available in starting content 102. In some embodiments, the starting content is up-converted using a content profile data that is associated with at least one rule for converting encodings. The profile data, in some embodiments, is associated with the desired interpretation. In some embodiments, formatting and/or text and/or outline hierarchy data is used to up-convert, e.g., by identifying and processing differently text that is in title case or formatted in a manner commonly used to distinguish major headings from other text. By up-converting content data, advanced search functions are possible. For example, when searching an invoice, fields such as "items", "quantity", "price" and "description" can be automatically extracted from the starting content for inclusion as fields in a search dialog. Using the names and/or data types of such fields, which are normally part of the schema of the up-converted representation, a custom search dialog can be constructed on the fly that permits a user to apply context-aware searches. In particular, functions and relations can be applied to the search terms to form predicates, and logical relations can be applied to predicates to form propositions. For example, this would enable a user to specify "invoice" interpretation, then search the invoice for "items" whose "quantity" is greater than "10" and whose "price" is greater than "US $100", or whose "description" contains "diamond". In this example, "greater than" and "contains" are relations applied to the search terms, while "and" and "or" are logical relations applied to predicates.

Representation data 108 includes converted starting content 102 in an encoding associated with the desired interpretation. In some embodiments, the representation data includes XML (Extensible Markup Language) encoding of the starting content in the desired interpretation. For example, if the desired interpretation is a "Financial Summary," representation data 108 includes at least a portion of starting content 102 parsed into XML encodings of assets, liabilities, shares, revenue, and expenses. In some embodiments, representation data 108 includes an in-memory representation/encoding of data associated with starting content 102. In some embodiments, starting content 102 includes data already in the encoding of representation data 108. In various embodiments, content processing 106 is responsive to the file format of starting content 102. In various embodiments, interpretation 104 includes a two-way mapping between starting content 102 and representation data 108. Each interpretation may support various starting content encodings and/or various representation data encodings.

Representation data 108 and desired interpretation 104 is used in view generation 110 to produce view output 112. In some embodiments, view output 112 includes a rendering of representation data 108 based on interpretation 104. For example, in various embodiments representation data 108 is converted to output 112 comprising content data in one or more of XHTML+CSS (Extensible HyperText Markup Language+Cascading Style Sheet), SVG (Scalable Vector Graphics), and/or XAML (Extensible Application Markup Language) format using XSLT (Extensible Stylesheet Language Transformation). In some embodiments, the conversion and/or view generated therefrom are determined at least in part by the desired interpretation 104. An example of view output 112 is a "structure view" that graphically shows relationships between data contained in representation data 108 in a manner determined at least in part by desired interpretation 104 (e.g., slides in the case of a presentation interpretation of the content, a matrix of cells in the case of a financial report or other spread sheet interpretations, columns of text with appropriate headings and subheadings in the case of a magazine article interpretation, etc. In some embodiments, interpretation 104 includes one or more associated view representations that can be selected by a user. When various views are selected by a user, representation data 108 is used to render the output associated with the selected view. In some embodiments, desired interpretation 104 specifies a default format for representation data 108 and/or view output 112. In some embodiments, data associated with view output 112 can be saved in a format directly used to render a view output. If desired, representation data 108 is serialized 114 to produce output content 116. In some embodiments, serialization 114 includes saving an interpretation-specific conversion of starting content 102. In some embodiments, serialization 114 is associated with file format conversion.

Figure 2:
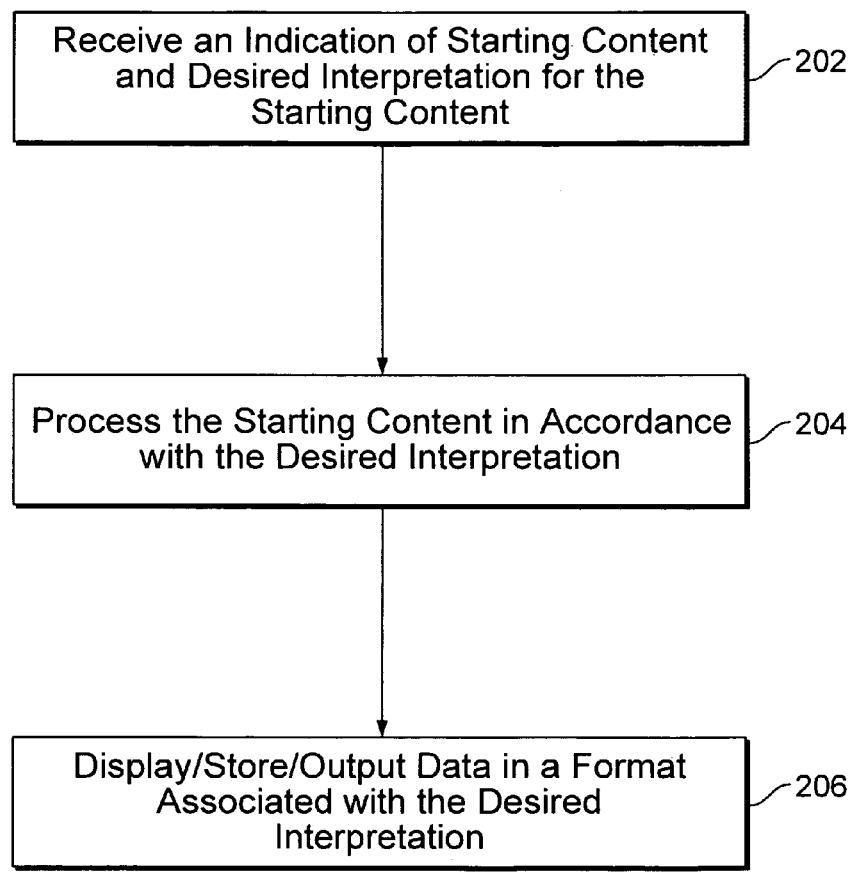
FIG. 2 is flow chart illustrating an embodiment of a process for converting starting content.

FIG. 2 is flow chart illustrating an embodiment of a process for converting starting content. At 202, an indication of starting content and desired interpretation for the starting content is received. The indication may be specified by a user, pre-configured, automatically configured (e.g., configuration at least in part performed by an automatic process), and/or dynamically configured (e.g., configuration based upon dynamic data). In some embodiments, the starting content is starting content 102 of FIG. 1. In some embodiments, the desired interpretation is desired interpretation 104 of FIG. 1. At 204, the content is processed in accordance with the desired interpretation. In some embodiments, the processing includes converting the starting content to a different encoding from the original encoding of the starting content. The different encoding and/or the processing of the conversion is determined at least in part by the desired interpretation. For example, a PDF (Portable Document Format) starting content is parsed and up-converted to an in-memory XML encoding determined by the desired interpretation. In various embodiments, content processing includes performing and/or preparing the starting content for performing one or more of the following: re-purposing, re-styling, extracting, parsing converting, searching, combining, accessing, querying, transforming, rendering, viewing, serializing, publishing, and/or saving content. In some embodiments, the processing is associated with content processing 106 of FIG. 1. At 206, data is displayed/stored/outputted in a format associated with the desired interpretation. In some embodiments, 206 is associated with generate view 110 and/or serialize 114 of FIG. 1.

Figure 3:
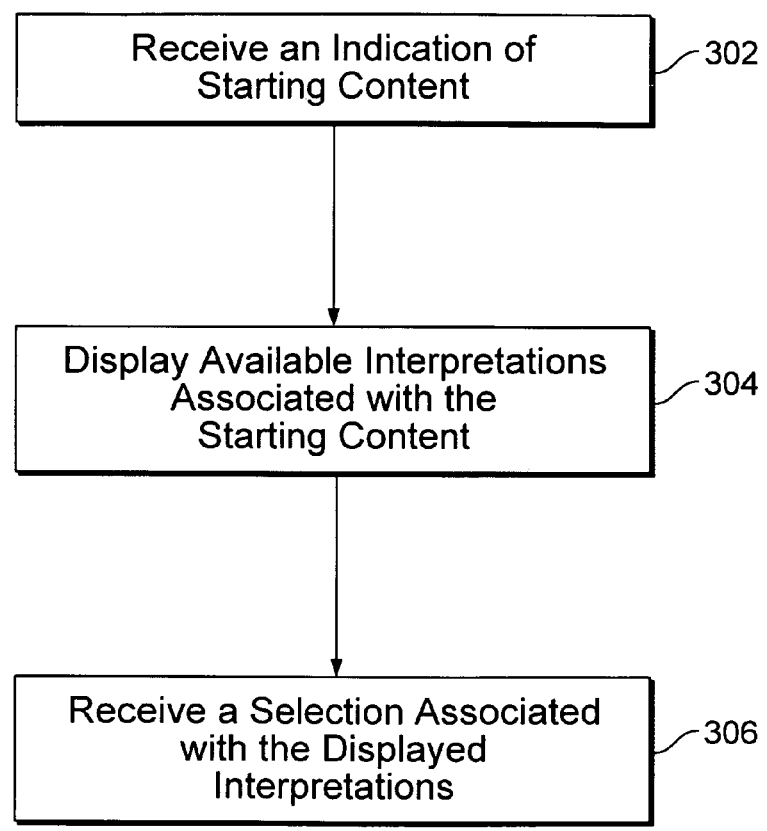
FIG. 3 is a flow chart illustrating an embodiment of a process for receiving an indication of starting content and a desired interpretation.

FIG. 3 is a flow chart illustrating an embodiment of a process for receiving an indication of starting content and a desired interpretation. In some embodiments, the process of FIG. 3 is included in 202 of FIG. 2. At 302, an indication of starting content is received. In some embodiments, the starting content includes a file selected on a File . . . Open dialog window. At 304, one or more available interpretations associated with the starting content are displayed. In some embodiments, each interpretation is associated one or more of the following: an interpretation identifier, a specification of one or more encodings that can be opened and/or saved using the interpretation, a specification of one or more output views that can be rendered, a default configuration, a default view to be rendered, and a specification of one or more search fields/categories. In some embodiments each search field/category includes a name and a data type for use in interpretation-specific query interfaces that may permit use of functions and relations within logical predicates. At 306, a selection associated the displayed interpretations is received. For example, one of the displayed interpretations is selected from a dropdown selection box. The selected interpretation indicates how to interpret the starting content.

Figure 4:
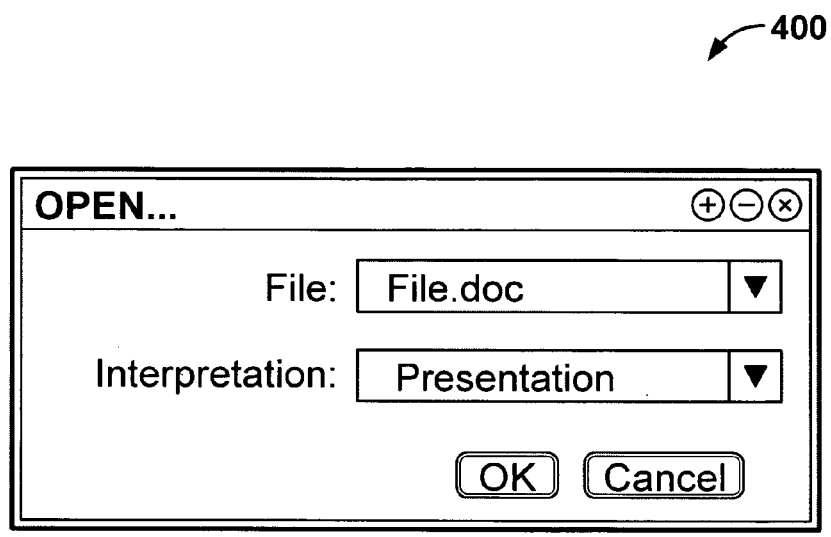
FIG. 4 is a diagram illustrating an embodiment of an open dialog window.

FIG. 4 is a diagram illustrating an embodiment of an open dialog window. In some embodiments, open dialog window 400 is at least in part used in indicating starting content and desired interpretation in the process of FIG. 3. In some embodiments, open dialog window 400 is displayed to a user when an application is started and/or when a menu item/icon is selected. Open dialog 400 includes a dropdown file selection box and a dropdown interpretation selection box. The dropdown selection boxes are merely illustrative. Any input interface may be used, including a text input box, a check box, a radio selection, a file browse dialog, and/or a selection list. In some embodiments, the list of interpretations in the interpretation dropdown box is associated with the selected file in the file dropdown box, and the list of interpretations in the interpretation dropdown box is updated as files with different associated interpretations are selected in the file dropdown box. In various embodiments, one or more other selection fields exist on the open dialog window. For example, one or more configurations associated with the selected interpretations is specified through open dialog window 400.

Figure 5:
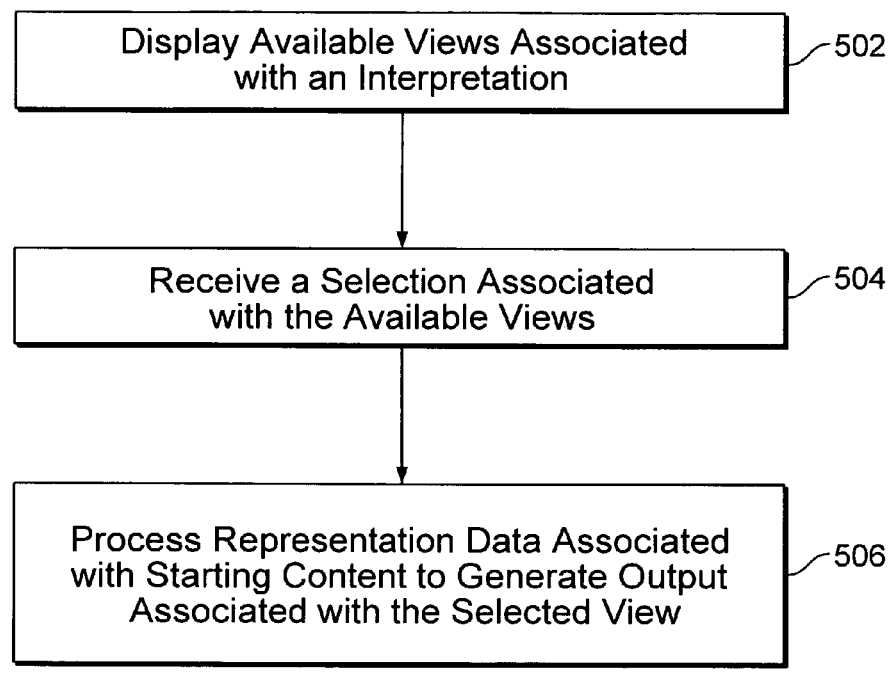
FIG. 5 is a flow chart illustrating an embodiment of a process for generating an output associated with a selected view.

FIG. 5 is a flow chart illustrating an embodiment of a process for generating an output associated with a selected view. In some embodiments, the process of FIG. 5 is included in 206 of FIG. 2. At 502, available view(s) associated with an interpretation is displayed. The views, in some embodiments, are associated with organization and/or visualization of a content representation data. Examples of the views include an article view and a layout view for a newspaper interpretation; a summary view, a thumbnail view, and a slide show view for a presentation interpretation; a table view, a graph view, and a pie chart view for a data set interpretation; a task view, a personnel view, and a timeline view for a project plan interpretation; and a Sankey view and a matrix view for a resource flow interpretation. In some embodiments, the results of an interpretation-specific search are displayed within, as part of, or in a manner that relates to the view. In some embodiments this includes a marking or other geometric indication of the found text and other objects. For example, found items may be underlined, outlined, highlighted with a different background color, or indicated with markings in the margin. Found items may also be rendered separately, on their own or in addition to the main document view. When rendered separately, there may be lines, hyperlinks or other indicators of their position in the document, and these indicators may be shown only when the user selects a given search result, iterates through the list to a given search result, or all shown at once. The available views may be listed on a dropdown menu bar, a dropdown selection box, a toolbar, a sidebar, a window pane, or a tabbed window. At 504, a selection associated the available views is received. For example, a selected view to be rendered is received. In some embodiments, displaying and receiving the selection associated with the available views is optional. A default view is used to generate an output. At 506, a representation data associated with a starting content is processed to generate an output associated with the selected view. In some embodiments, 506 is associated with generate view 110 of FIG. 1. The output associated with the selected view is in a format used at least in part to render a display. In various embodiments, as a new view is selected, a new view output is constructed from the same representation data. In some embodiments, the output associated with the selected view can be saved in a format capable of capturing a rendition of content based on an interpretation.

Figure 6:
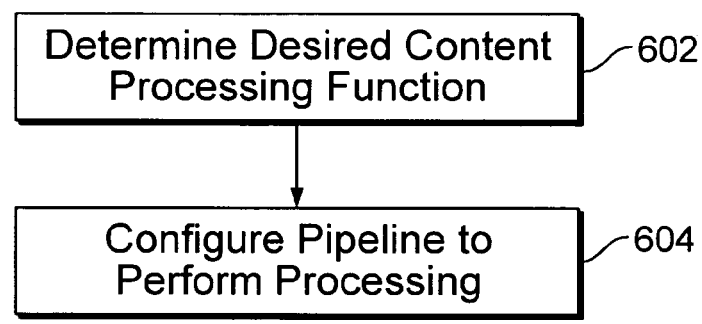
FIG. 6 is a flow chart illustrating an embodiment of a process for processing content data.

FIG. 6 is a flow chart illustrating an embodiment of a process for processing content data. In some embodiments, the process of FIG. 6 is implemented in 204 of FIG. 2. At 602, desired content processing function is determined. In some embodiments, determining the desired content processing function includes determining an encoding of a desired representation data, such as representation data 108 of FIG. 1, and/or one or more steps of processing a starting content to obtain the desired representation data. In some embodiments, determining the desired content processing function includes determining the nature and/or characteristics of a starting content. Examples of the nature and/or characteristics include one or more of the following: content type (e.g., text, graphic, audio, video), content format, content encoding, and content file(s) attributes. In various embodiments, the desired result of the content processing function may include producing a representation data, producing a determination, rendering content in a desired manner or format, modification of content, and/or extraction of content.

At 604, a pipeline is configured to perform the desired processing. Configuring the pipeline includes determining, configuring, and/or connecting one or more components to perform the desired processing. In various embodiments, the pipeline is used to manage data flow and/or order of execution associated with the components. In some embodiments under at least certain circumstances the pipeline configuration determines how the output stream(s) of one component feed the input stream(s) of other components. In some embodiments, the pipeline is preconfigured using a configuration file. In some embodiments, the pipeline is configured dynamically. In various embodiments, the components are interconnecting translation components. For example, a generator component parses and maps a binary document to a corresponding XML (Extensible Markup Language) format. A second component sorts the XML format data without changing the schema, and a third component converts the XML document to another XML format associated with a higher level encoding schema.

Figure 7:
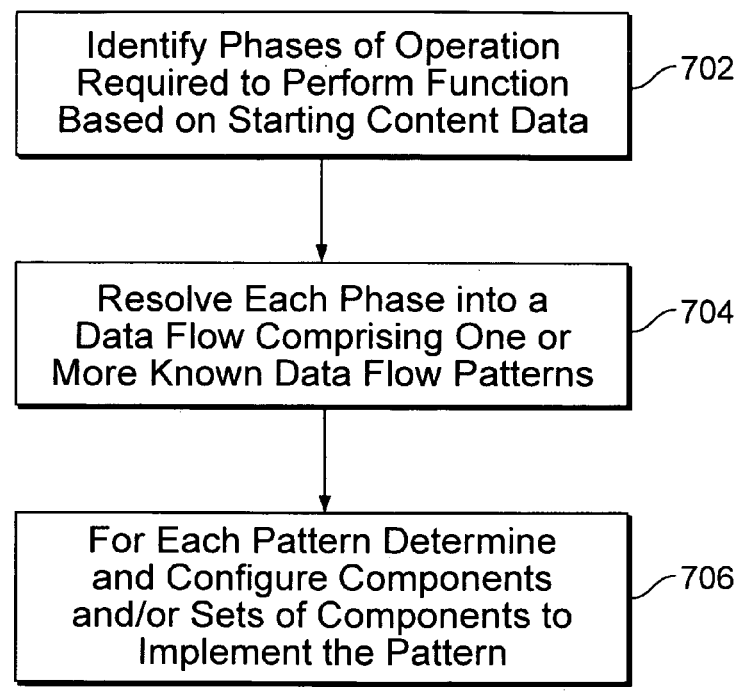
FIG. 7 is a flow chart illustrating an embodiment of a process for determining content processing required to achieve a desired result.

FIG. 7 is a flow chart illustrating an embodiment of a process for determining content processing required to achieve a desired result. In some embodiments, the process of FIG. 7 is included in 602 of FIG. 6. At 702, phases of operation required to perform a desired content processing function based on starting content data are identified. An example of a three phases of operation includes (1) transforming starting content data to a format associated with a common meta-language, (2) performing transformations associated with the desired interpretation, and (3) encoding the transformed data. At 704, each of the identified phases is resolved into a data flow comprising one or more known data flow patterns. In some embodiments the data flow includes at least a portion of a data flow pipeline. In some embodiments resolving the data flow includes determining order, inter-relationships, and dependencies between the data flow patterns. In some embodiments, the data flow patterns are chosen from one or more preconfigured data flow patterns. In some embodiments, a data flow pattern is configurable. For example, a data flow pattern includes a configuration data input. In some embodiments, at least one data flow pattern is generated dynamically as required by the desired processing. In some embodiments, identifying the phases is optional. The desired processing function is resolved into one or more know data flow patterns.

At 706, for each data flow pattern, a component and/or sets of components are configured to implement the pattern. The component performs at least a portion of processing used to achieve a desired result. At least a portion of the input to one component includes at least a portion of the source content. The component may be reused in other processing. In some embodiments, other content (e.g. component configuration data, user profile, session information, and/or Web service calls) is included as an input to a component. Configuring the component in various embodiments includes determining the input to the component and/or determining data and/or configurations needed to perform a function of the component. In various embodiments, the component is chosen from a group of existing components, and/or an indication that a new component is needed is generated. In some embodiments, the new component is dynamically generated in response to the indication, e.g., by a manual or at least partly automated process. In some embodiments, at least a portion of a component is generated from one or more preexisting components, such as by customizing or configuring an existing component to perform a required translation. In some embodiments, resolving each of the identified phases into the data flow includes connecting one or more components together. In various embodiments, connecting the next component includes associating at least a portion of input data to the next component from an output of one or more other components and/or associating an order to the processing associated with the next component with respect to one or more other components. Connecting the component, in some embodiments, includes determining order, inter-relationships, and/or dependences associated the component. If a component is dependent on another component, a component may not be connected until the dependent component has been determined, configured, and/or connected. The data flow, including pattern/component specification, configuration, and/or connection, is specified using a configuration file and/or specified substantially concurrent while performing at least a portion of the desired processing function.

In some embodiments, using one or more reconfigurable and reusable components, selected in some embodiments from a toolkit group of available components, to implement one or more data flow patterns to achieve desired content processing enables content management solutions to be provided without the use of traditional full-featured content management applications and/or systems. The approaches described herein therefore provide a relatively lightweight solution to problems that in the past may have required more substantial investment in specialized servers and/or full-featured content management software.

Figure 8:
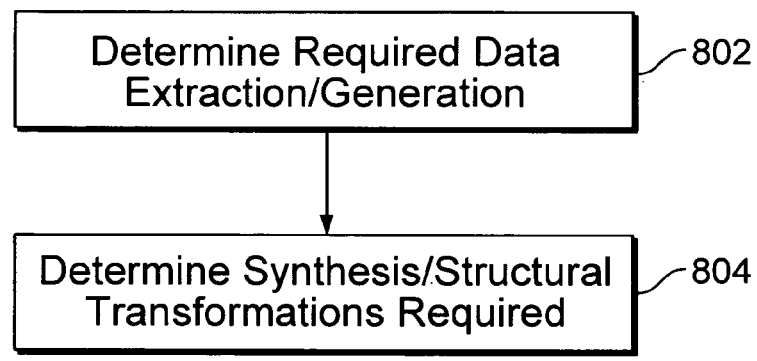
FIG. 8 is a flow chart illustrating an embodiment of a process for identifying phases of operation required to perform a desired processing function.

FIG. 8 is a flow chart illustrating an embodiment of a process for identifying phases of operation required to perform a desired processing function. In some embodiments, the process of FIG. 8 is included in 702 of FIG. 7. At 802, required data extraction/generation is determined. The extraction/generation may include transforming at least a portion of source content data to a format associated with a common meta-language. An example of the common meta-language is XML. At 804, synthesis/structural transformations required are determined. Synthesis/structural transformations may include determining transformations associated with the desired content processing using the common meta-language. For example, XML to XML transformations are determined.

By pipelining components, processing the electronic content, in some embodiments, remains highly flexible, adaptable and re-configurable. In some embodiments, additional efficiencies are realized by reusing components and/or pipelines or portions thereof. Unlike monolithic content processing solutions that require redevelopment of the entire system when new formats and desired functions are developed, new components can be added and configured to an already existing pipeline without redevelopment of the entire solution. In various embodiments, this enables easy reuse of components by simply redefining the pipeline to include the new components and, as applicable, new source content (input) and output streams. Change in data source, data format, schema, content management function, component configuration, publishing target, and/or publication styling can be easily adapted through the pipeline redefinition.

Any suitable pipeline technology may be used to implement the pipeline. In some embodiments, the Cocoon framework from Apache Software Foundation of Forest Hill, Md. is used to implement a pipeline for web publishing. The Cocoon pipeline is defined using a "sitemap file" written in an XML grammar. In some embodiments, a batch file is used to implement a pipeline. A batch file, in some embodiments, provides a lightweight way to implement a pipeline. In various embodiments, one or more Ant build files (XML files that encode build instructions for each target) of the Apache Software Foundation is used to implement a pipeline.

In some embodiments, a plug-in and/or add-on to a computer program product for content encoding rendering is used to provide context-awaver content conversion and/or interpretation specific views. The plug-in/add-on is associated with one particular interpretation or a set of particular interpretations. In some embodiments, the plug-in/add-on is associated with an interface for providing information to the host program, which may include such information as the ID and/or name and/or description of the plug-in's supported interpretation(s), the supported input encodings, the supported output encodings, the IDs and/or names and/or descriptions of the supported views, and the names and data types of the supported search fields or categories. In some embodiments, the plug-in/add-on is associated with a software interface for interacting with the host program, which may include a function to invoke processing content according to the chosen interpretation, a function to invoke creation of a view or an encoding of a view that is passed back to the host, and functions to invoke the predicates of a custom search. In some embodiments, the plug-in/add-on is associated with processing the starting content to generate a representation data comprising a second encoding of the starting content, wherein the second encoding is determined automatically and at least in part by the desired interpretation. In some embodiments, the plug-in/add-on is associated with rendering the representation data using a view associated with the desired interpretation. In some embodiments, the plug-in/add-on is associated with determining the search results arising from evaluating a particular predicate associated with the desired interpretation.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of content encoding rendering, comprising:
   receiving an indication of a desired interpretation of a starting content having a first encoding, wherein the desired interpretation is included in a plurality of interpretations associated with the starting content;
   using a processor to process the starting content to generate a representation data comprising a second encoding of the starting content, wherein the second encoding is determined automatically and at least in part by the desired interpretation, and wherein the processor is configured to parse the starting content having the first encoding, reconstruct an original semantic relationship encoded in the first encoding, and determine automatically based on an attribute thereof a new semantic relationship not encoded in the first encoding, and encode the reconstructed original semantic relationship and the new semantic relationship in said second encoding; and
   rendering the representation data using a view included in a plurality of views associated with the desired interpretation.

2. A method as recited in claim 1, further comprising receiving an indication to render the representation using a second view included in the plurality of views and rendering the second encoding using the second view.

3. A method as recited in claim 1, wherein the indication of the desired interpretation is at least in part specified by a user and processing the starting content does not require the user to know the file format of the second encoding.

4. A method as recited in claim 1, wherein the first encoding and the second encoding include one or more of the following: a file format of the starting content, an organization of data in the starting content, a structure of data in the starting content, an attribute of data in the starting content, a semantic relationship of data in the starting content, and an in-memory representation of the starting content.

5. A method as recited in claim 1, wherein the desired interpretation is associated with one or more of the following: a curriculum vitae, a journal article, a magazine, a newspaper, a greeting card, a poster, a presentation, a photo album, an expense form, a financial report, a graph, a flowchart, and a map.

6. A method as recited in claim 1, wherein one or more steps of the processing is at least in part determined by the desired interpretation.

7. A method as recited in claim 1, wherein processing the starting content includes parsing at least a portion of the first encoding and reconstructing in the second encoding at least a portion of a structure of the first encoding.

8. A method as recited in claim 1, wherein processing the starting content includes performing or preparing the starting content for performing one or more of the following: re-purposing, re-styling, extracting, parsing converting, searching, combining, accessing, querying, transforming, rendering, viewing, serializing, publishing, and saving the starting content.

9. A method as recited in claim 1, wherein processing the starting content includes determining a semantic relationship between two or more content elements comprising the starting content and including in the second encoding an encoding of the semantic relationship.

10. A method as recited in claim 9, wherein the semantic relationship is not encoded in the first encoding.

11. A method as recited in claim 1, wherein processing the starting content includes using a content profile data that is associated with at least one rule for converting encodings, and the content profile data is associated with the desired interpretation.

12. A method as recited in claim 1, wherein processing the starting content includes determining the second encoding based at least in part on one or more characteristics of the starting content.

13. A method as recited in claim 1, wherein processing the starting content includes configuring a pipeline to perform the processing.

14. A method as recited in claim 13, wherein the pipeline is used to manage one or more of data flow and order of execution associated with one or more processing components.

15. A method as recited in claim 1, wherein the second encoding includes an Extensible Markup Language (XML) encoding of the starting content.

16. A method as recited in claim 1, wherein the second encoding is at least in part an in-memory representation of the first encoding.

17. A method as recited in claim 1, wherein the desired interpretation is associated with more than one encoding format.

18. A method as recited in claim 1, wherein the view is associated with one or more of an organization and a visualization of at least a portion of the second encoding.

19. A method as recited in claim 1, wherein the view is associated with one of one or more rendering options associated with the desired interpretation.

20. A method as recited in claim 1, wherein one or more views associated with the desired interpretation is listed on a dropdown menu bar, a dropdown selection box, a toolbar, a sidebar, a window pane, or a tabbed window.

21. A method as recited in claim 1, wherein rendering the second encoding includes using an Extensible Stylesheet Language Transformation (XSLT) associated with the view to transform the second encoding.

22. A method as recited in claim 1, wherein rendering the second encoding includes generating an output associated with an Extensible HyperText Markup Language (XHTML) and a Cascading Style Sheet (CSS).

23. A method as recited in claim 1, wherein an output of the rendering can be saved in a format capable of capturing the rendering.

24. A method as recited in claim 1, wherein the desired interpretation is associated with one or more of the following: an interpretation identifier, a specification of one or more encodings that can be opened or saved using the desired interpretation, a specification of one or more output views that can be rendered, a default configuration, a default view to be rendered, and a specification of one or more search fields or categories.

25. A method as recited in claim 24, wherein the specification of the one or more search fields or categories includes a specification of an identifier or a data type associated with the search fields or categories.

26. A method as recited in claim 1, wherein receiving the indication of the desired interpretation includes receiving a selection associated with the desired interpretation from a list of available interpretations determined at least in part by the starting content.

27. A method as recited in claim 1, further comprising providing a search on the representation data by using a search field or a category associated with the desired interpretation, wherein a result of the search is provided with the rendered representation data.

28. A system for content encoding rendering, comprising:
a processor configured to receive an indication of a desired interpretation of a starting content having a first encoding, wherein the desired interpretation is included in a plurality of interpretations associated with the starting content, process the starting content to generate a representation data comprising a second encoding of the starting content, wherein the second encoding is determined automatically and at least in part by the desired interpretation, wherein the processor is configured to parse the starting content having the first encoding, reconstruct an original semantic relationship encoded in the first encoding, and determine automatically based on an attribute thereof a new semantic relationship not encoded in the first encoding, and encode the reconstructed original semantic relationship and the new semantic relationship in said second encoding, and render the representation data using a view included in a plurality of views associated with the desired interpretation; and
a memory coupled with the processor, wherein the memory is configured to provide the processor with instructions.

29. A computer program product for content encoding rendering, the computer program product being embodied in a tangible computer readable medium and comprising computer instructions for:

receiving an indication of a desired interpretation of a starting content having a first encoding, wherein the desired interpretation is included in a plurality of interpretations associated with the starting content;

processing the starting content to generate a representation data comprising a second encoding of the starting content, wherein the second encoding is determined automatically and at least in part by the desired interpretation, and wherein processing the starting content to generate the representation includes parsing the starting content having the first encoding, reconstructing an original semantic relationship encoded in the first encoding, and determining automatically based on an attribute thereof a semantic relationship not encoded in the first encoding, and encoding the reconstructed original semantic relationship and the new semantic relationship in said second encoding; and rendering the representation data using a view included in a plurality of views associated with the desired interpretation.

* * * * *